Oct. 29, 1957 L. G. PLANT 2,811,009
SIDE DELIVERY RAKE
Filed Nov. 13, 1953 3 Sheets-Sheet 1

INVENTOR.
LELAND G. PLANT,
BY

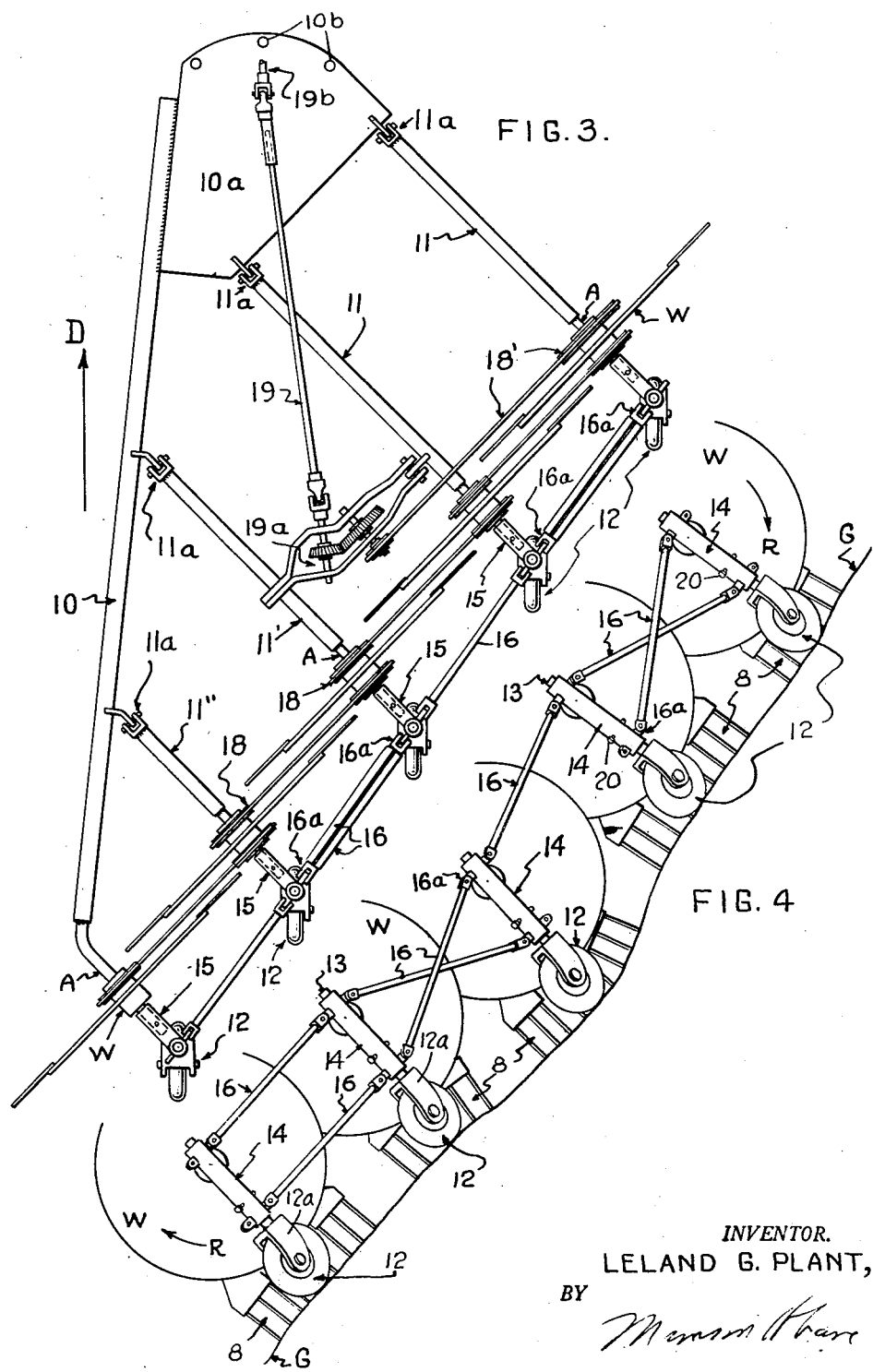

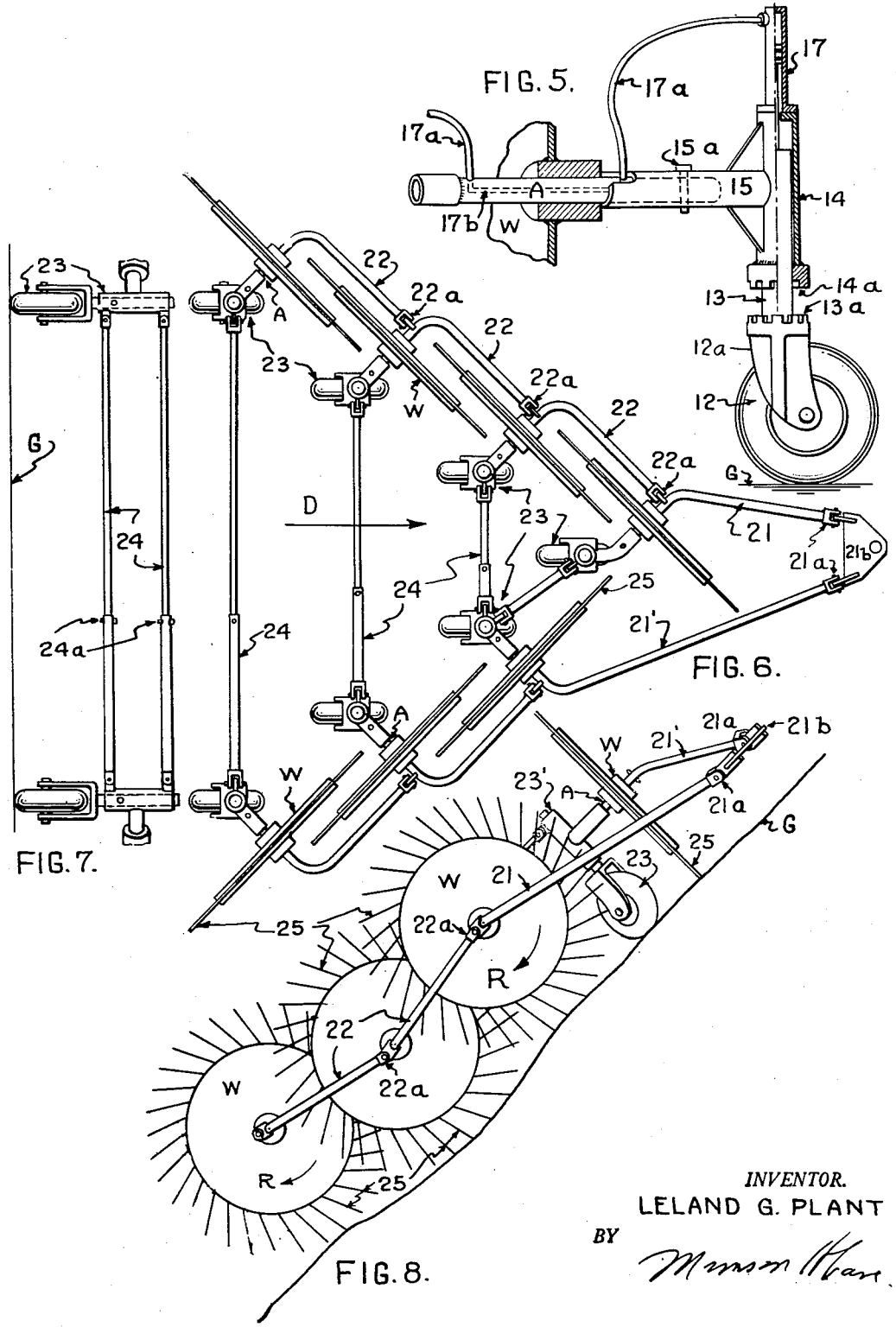

United States Patent Office 2,811,009
Patented Oct. 29, 1957

2,811,009

SIDE DELIVERY RAKE

Leland G. Plant, Edenton, N. C.; Pattie Louise Moore Plant, executrix of said Leland G. Plant, deceased Application November 13, 1953, Serial No. 391,797

7 Claims. (Cl. 56—377)

This invention relates to new and useful improvements in farm tractor attachments adapted for raking hay, and the principal object of the invention is to provide an attachment of the nature herein disclosed employing a system of rigid members which are pivotally connected together and are equipped with rigid axle shafts each having a raking wheel rotatable thereon, together with interconnecting spacer members which are pivoted to the rigid members so as to produce a loosely articulated structure wherein the raking wheels are disposed in echelon formation and are individually free to rise and fall with irregularities of the ground while rotating in vertical planes oblique to the direction of travel of the tractor, so that a windrow left by one raking wheel is deposited into the path of a next adjacent wheel and finally the hay is laid in a windrow at one side of the swath spanned by the several wheels.

Other objects and features of the invention will become apparent upon perusal of the following description, taken in conjunction with the accompanying drawings, wherein like characters of reference are employed to designate like parts, and wherein:

Figure 3 is a top plan view of a modified form of the invention;

Figure 4 is an elevational view of the form of the invention shown in Figure 3, some of the ground engaging members of the raking wheels being omitted for sake of clarity;

Figure 5 is a fragmentary elevational detail, partly in section, showing the locking means for one of the caster wheels;

Figure 6 is a top plan view of another modified form of the invention;

Figure 7 is a fragmentary rear end elevational view of the form shown in Figure 6; and Figure 8 is a side elevational view of the form of the invention shown in Figures 6 and 7.

Figure 1:
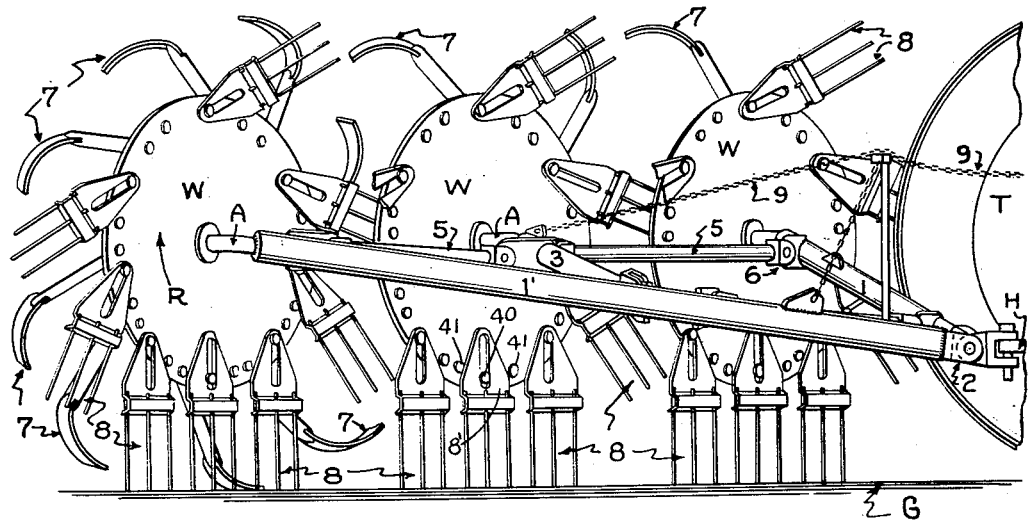
Figure 1 is an elevational view of the invention attached to a tractor, only a portion of the latter being shown.
Figure 2:
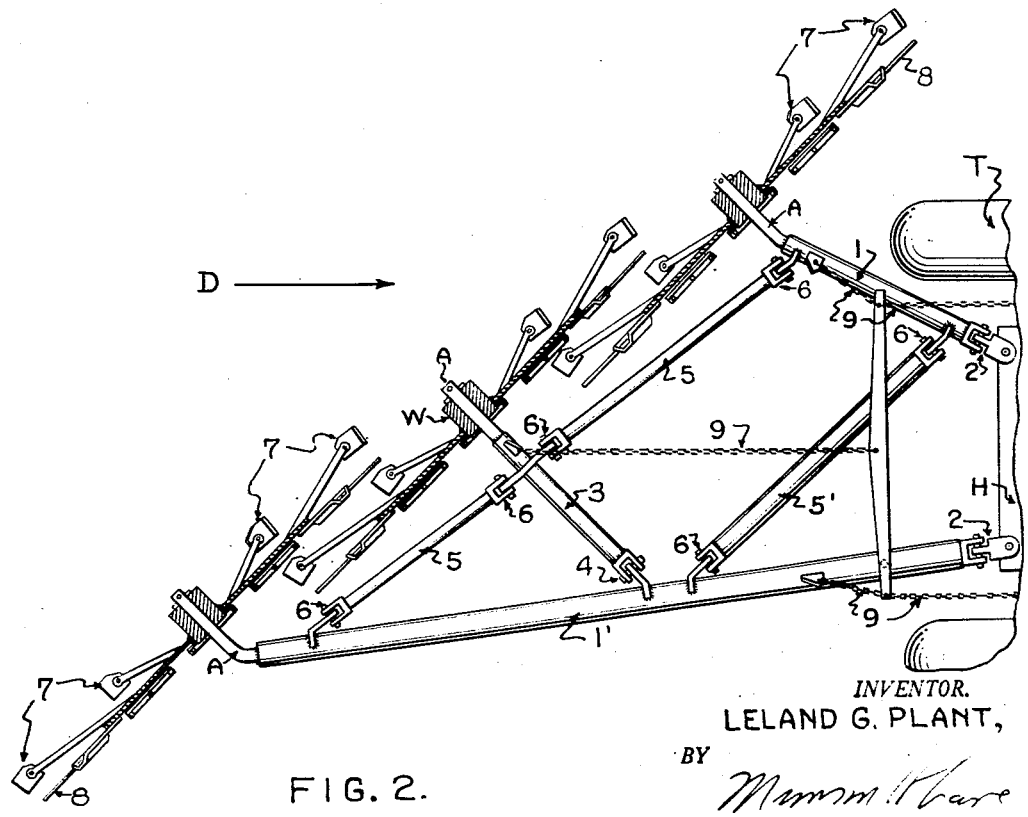
Figure 2 is a top plan view thereof, the raking wheels being broken away and shown in section.

Referring now to the accompanying drawings in detail, particularly to Figures 1 and 2 thereof, the raking attachment in accordance with the invention comprises a rigid spine member 1 connected at one end thereof by a flexible coupling 2 to the conventional hitch H of a farm tractor T. A somewhat longer but otherwise similar spine member 1' is also connected to the hitch H by another flexible coupling 2, the two spine members extending rearwardly from the hitch in divergent relation, as shown. A rib member 3 is pivoted at its forward end by a flexible coupling 4 to an intermediate portion of the spine member 1', and a pair of rigid spacer bars 5 extend from the rib member 3 to the respective spine members 1 and 1', being pivotally connected to both the rib member and the spine members by flexible couplings 6. Another spacer bar 5' extends between the spine members 1, 1' and is pivotally connected thereto by the flexible couplings 6.

The rear ends of the spine members 1, 1' and rib member 3 are provided with rigid axle shafts A each having a raking wheel W rotatably mounted thereon. These raking wheels are provided with ground engaging means of a suitable type, such as for example, peripherally mounted feet 7 by which the raking wheels are supported at constant hub height above the ground G, it being apparent from the foregoing that the articulated arrangement of the spine members 1, 1', rib member 3 and spacer bars 5, 5', as afforded by the flexible couplings 2, 4 and 6, permits the raking wheels W to rise and fall independently of one another, in accordance with irregularities of the ground.

It will be also noted that the raking wheels W are rotatable in vertical planes oblique to the direction of travel D of the tractor, and that the spacer bars 5, 5' maintain the spine members 1, 1' and the rib member 3 in a predetermined horizontal angular relation so that the raking wheels are disposed in echelon formation, as shown.

The raking wheels W are also provided with suitable raking members such as, for example, groups of tines 8, held in slotted brackets 8' which are swingably and slidably attached to the wheels by suitable pins 40. Stop pins 41 are provided on the wheels W adjacent each of the brackets 8' to limit the extent of swinging thereof relative to the wheels. The tine-equipped brackets swing and slide on the pins 40 in response to gravity and assume the various positions as shown relative to the wheels, as the wheels rotate. The direction of rotation of the wheels is indicated at R.

Suitable flexible elements such as lengths of chain 9 extend from the spine members 1, 1' and rib member 3 to the conventional power lift mechanism (not shown) of the tractor T, whereby the entire attachment may be raised clear of the ground when turning sharp corners or for purposes of transportation from one location to another. When the chains 9 are slack, however, the raking wheels W rest with their feet 7 on the ground, as already stated.

If desired, the slidable and swingable tine-equipped brackets 8' may be substituted by tines of a fixed length, as disclosed in my Patent No. 2,670,588.

Referring now to a modified form of the invention illustrated in Figures 3, 4 and 5, a single rigid spine member 10 is provided at its front end with a flat plate 10a having a plurality of holes 10b for selective attachment to a suitable tractor hitch. A plurality of rigid rib members 11, 11' and 11" are connected at their forward ends by flexible couplings 11a to the spine member 10 and plate 10a as shown, the rear ends of these rib members and the rear end of the spine member 10 being equipped with rigid axle shafts A on which the raking wheels W are rotatably mounted. The wheels W are operatively connected together for simultaneous rotation by endless belt or chains 18, driven by an endless belt or chain 18' from a gear unit 19a, suitably mounted on one or more of the rib members 11, 11' and 11". A universally jointed drive shaft 19 connects the gear unit 19a to the usual power take-off 19b of the tractor.

Tubular casings or extensions 15 are secured to the axle shafts A rearwardly of the wheels W by suitable pins 15a and are provided at their rear ends with vertically disposed, tubular pedestals 14 having stems 13 slidable therein. The lower ends of these stems are secured to yokes 12a provided with caster wheels 12. The stems 13 are rotatable in the pedestals 14, but may be locked against such rotation so as to correspondingly lock the caster wheels 12 in a fixed angular relationship to the raking wheels W. The locking means for this purpose involves the provision of co-operating serrated or castled portions 13a, 14a on the yokes 12a and pedestals 14, respectively, it being understood that when these portions are interlocked, the yokes 12a are sustained in a fixed angular relation relative to the raking wheels W. However, hydraulic cylinders 17 are provided at the upper ends of the pedestals 14 and are suitably operatively connected to the stems 13, so that when these cylinders are actuated to slide the stems 13 downwardly, the interlocked portions 13a, 14a are separated and the stems may then be rotated in the pedestals so as to permit positioning of the caster wheels 12 at any desired angular relation with respect to the raking wheels W. The axle shafts A are preferably provided with ducts 17b communicating with flexible hoses 17a for transmitting hydraulic fluid under pressure to the cylinders 17 from a suitable pump (not shown) on the tractor.

As is best seen in Figure 4, the pedestals 14 are connected together by a set of spacer bars 16 having flexible couplings 16a at the ends thereof for connection to the pedestals. The spacer bars are used either singly, or in crossed or parallel pairs as shown, but in any event the arrangement is such as to permit free articulation and independent rising and falling movement of the individual raking wheels in accordance with irregularities of the ground.

In connection with this embodiment of the invention it is to be noted that a single coupling pin (not shown) may be used in the holes 10b for connecting the attachment to the tractor hitch at only one point, whereby the attachment may assume various angular positions relative to the tractor and the oblique planes of rotation of the raking wheels are correspondingly variously disposed relative to the direction of tractor travel. If desired the attachment may be locked in a fixed angular relationship by the locking means 13a, 14a, so that casters 12 follow the direction of travel of the tractor rather than being free to swivel as they are when the cylinders 17 are actuated to disengage the locking means. Moreover, by selective positioning of the coupling pin on the hitch in the holes 10b which are at horizontally spaced locations in the plate 10a, a variation may be obtained in the horizontal angle between the oblique planes of rotation of the raking wheels and the direction in which the tractor is towing the attachment. On the other hand, in the embodiment of Figures 1 and 2, the desired horizontal angle between the planes of rotation of the raking wheels and the direction of travel of the tractor is maintained by the attachment of the two spine members 1, 1' at two horizontally spaced points to the hitch H.

If the ground engaging means of the raking wheels W in the embodiment of Figures 3–5 are depended upon for imparting rotation to the raking wheels, the power drive 18, 19, etc., need not be employed. However, if the raking wheels are supported above ground by the caster wheels 12, the power drive 18, 19, etc. is used for rotating the raking wheels. As shown in Figure 4, keeper pins 20 may be provided in the pedestals 14 and received selectively in vertical rows of apertures (not shown) formed in the stems 13 for supporting the raking wheels W at various predetermined fixed distances above ground, independently of the actuation of the stems 13 by the hydraulic cylinders 17.

Referring now to another modified form of the invention shown in Figures 6, 7 and 8, a pair of spine members 21, 21' are connected at their forward ends by flexible couplings 21a to a plate 21b which is adapted for attachment by a single pin (not shown) to the tractor hitch. A set of rib members 22 is connected to each of the spine members 21, 21' by flexible couplings 22a, the rib members in each set also being connected together by flexible couplings 22a, as illustrated, so as to produce an articulated structure.

The spine members 21, 21' and the rib members 22 are provided at their rear ends with axle shafts A carrying the rotatable raking wheels W as well as the vertical pedestals 23' equipped with caster wheels 23 at their lower ends, similarly to the embodiment of Figures 3–5. Telescopic spacer bars 24 extend between the pedestals 23', transversely of the two sets as shown, these bars being adjustable as to length by removable pins 24a which hold their slidably telescoped portions together. The raking wheels W are provided with suitable tines 25.

As will be noted, the raking wheels in this embodiment of the invention are in echelon formation in each set, rotating in oblique, vertical planes to the direction of travel D, the two sets of wheels having a pyramidal or rearwardly divergent form whereby to spread the swath raked thereby into two windrows as practiced in heavy raking operations wherein a relatively wide swath may be covered in a single movement. The angularity of the raking wheels to the direction of movement, and the width of the swath may be varied by simply adjusting the length of the telescopic spacer bars 24, while the articulated arrangement of the spine members 21, 21', rib members 22 and spacer bars 24 permits the raking wheels to rise and fall independently in accordance with irregularities of the ground.

The many advantages of the invention will be apparent from the foregoing description. For example, the tines of the raking wheels need not be relied upon to support the weight of the wheels or to cause the same to rotate, since the provision of the feet 7 as shown in the embodiment of Figures 1 and 2, or the provision of the caster wheels 12 or 23 in the embodiments of Figures 3–5 or 6–8, respectively, provides supporting means for the raking wheels at fixed, predetermined distances above ground, yet permits the wheel tines to engage the ground sufficiently to augment rotation of the wheels. Moreover, power drive means for the wheels may be provided as shown at 18, 19, etc., in the embodiment of Figures 3–5, it being understood, of course, that such power drive means may be provided in the embodiment of Figures 6–8 also, as so desired.

Raking wheels positioned and supported in a tractor attachment in accordance with this invention are capable of performing more effective and raking operations than those mounted upon a rigid frame structure supported by a running gear rigidly axled thereon in accordance with conventional practice. In such conventional devices spring-biased crank arms are usually employed for mounting the raking wheels on the frame structure so that the raking tines bear lightly on the ground, but in most instances the balance between the wheel weight and the counteracting spring means is so inefficient that proper supporting of the wheels at the desired distance above ground is difficult to attain, particularly when the apparatus is travelling over uneven ground. Comparatively, in the instant invention, proper support of the wheels at the desired level with respect to the ground is facilitated, yet the wheels are free to rise and fall independently of one another when irregularities in the ground are encountered.

Moreover, the arrangement of the spine members, rib members and spacer bars used in the various embodiments of the invention is such that the raking wheels rotate in oblique planes at the desired horizontal angle to the direction of travel of the device, and the general arrangement of the various parts and their construction is such that the apparatus may be inexpensively manufactured, easily assembled or disassembled, and economically maintained.

For this invention I claim:

1. In a raking attachment for tractors having at least two tine equipped wheels positioned in substantially parallel planes disposed at an oblique angle to their direction of travel; a rigid spine member pivotably attachable at its forward end to a tractor and extending rearwardly therefrom, an axle shaft extending from the rear of said spine member and rigid therewith, one of said raking wheels being journaled upon said axle shaft, a rigid rib member pinned pivotably at its forward end to the spine member and having a second axle shaft member rigid therewith and extending from its rear end and substantially parallel in vertical planes with the first axle shaft, a second raking wheel being journaled upon said second axle shaft, means for maintaining a substantially fixed angular relation between the spine member and rib member; and individual ground engaging means for each raking wheel to support it at a selected elevation above the ground.

2. A raking attachment as set forth in claim 1 having means for maintaining a desired horizontal angle between planes in which the raking wheels revolve and direction in which they are towed by a tractor to which attached.

3. A raking attachment as set forth in claim 2, wherein the means for maintaining a desired horizontal angle between planes in which the raking wheels revolve and direction in which they are towed include caster wheels employed individually as the ground engaging means for each raking wheel and other means for locking at least one caster wheel in a non-swiveling position relative to its raking wheel and at a desired horizontal angle to the axis of the raking wheel supported by said caster wheel.

4. A raking attachment as set forth in claim 2, wherein the means for maintaining a desired horizontal angle between planes in which the raking wheels revolve and direction in which they are towed include at least two locations optionally available for attachment of the spine to a tractor, said locations being horizontally spaced selectively at varying distances from the vertical plane in which said spine lies.

5. A raking attachment as set forth in claim 2, wherein the means for maintaining a desired horizontal angle between planes in which the raking wheels revolve and direction in which they are towed include use of at least two spine members of selectively fixed relative lengths and horizontally spaced locations at which they are separately attached to the tractor by which towed.

6. A raking attachment as set forth in claim 2, wherein the means for maintaining a desired horizontal angle between planes in which the raking wheels revolve and direction in which they are towed include use of two groups of spine, rib, axle shaft and raking wheel members, each group stemming rearwardly from a common point of pivotable attachment to a tractor but at divergent angles therefrom; and spacer bars of adjustable lengths each pinned at one end to a member of one group and at its other end to the corresponding oppositely disposed member of the other group.

7. A side delivery rake having a plurality of tine equipped raking wheels positioned in substantially parallel planes disposed at a horizontal angle oblique to their direction of travel; an axle shaft having one of said wheels journaled thereon, a rigid spine member extending forwardly from said axle shaft and adapted for horizontally pivotable attachment to a tractor whereby to support said spine at a selected elevation above the ground, a rigid rib member pivoted to said spine member and extending rearwardly therefrom, another rearwardly extending rigid rib member pivoted to the first mentioned rib member, additional axle shafts provided on the first and second mentioned rib members and having the remainder of said raking wheels rotatably mounted thereon, and ground engaging means for individually supporting each raking wheel at a predetermined distance above the ground independently of the other wheels, the aggregate weight of all parts of said rake being distributable in a desired ratio partly upon a towing tractor at its point of attachment thereto and the remainder wholly upon said ground engaging means.

References Cited in the file of this patent

UNITED STATES PATENTS

| 2,472,260 | Morrill | June 7, 1949 |
| 2,532,652 | Wray | Dec. 5, 1950 |
| 2,670,588 | Plant | Mar. 2, 1954 |
| 2,683,345 | Meyer | July 13, 1954 |

FOREIGN PATENTS

| 17,636 | Great Britain | 1900 |
| 153,125 | Great Britain | Nov. 4, 1920 |